United States Patent [19]

Miller et al.

[11] 3,908,025

[45] Sept. 23, 1975

[54] PET FOOD PRODUCT AND METHOD FOR FORMING SAME

[75] Inventors: Timothy A. Miller, Ferguson, Mo.; Carlo J. Hansen, Waterloo, Ill.

[73] Assignee: Ralston Purina Company, St. Louis, Mo.

[22] Filed: Sept. 21, 1972

[21] Appl. No.: 290,794

[52] U.S. Cl. ............... 426/623; 426/210; 426/212
[51] Int. Cl.² ............................................. A23L 1/18
[58] Field of Search ............ 99/2 R, 15, 14, 82, 83, 99/153, 150 R; 426/141, 195, 210, 216, 321, 364, 362, 516, 212, 351, 374, 448, 456, 805

[56] References Cited
UNITED STATES PATENTS

| | | | |
|---|---|---|---|
| 1,971,886 | 8/1934 | Votaw | 426/321 |
| 2,168,532 | 8/1939 | McMath et al. | 99/2 R |
| 2,958,600 | 11/1960 | Thurman | 426/362 |
| 3,010,828 | 11/1961 | Patterson | 426/362 |
| 3,115,409 | 12/1963 | Hallinan | 426/364 |
| 3,119,691 | 1/1964 | Ludington et al. | 99/2 R |
| 3,139,342 | 6/1964 | Linskey | 99/2 R |
| 3,357,918 | 12/1967 | Addison | 426/364 |
| 3,365,297 | 1/1968 | Burgess et al. | 99/2 R |
| 3,438,780 | 4/1969 | Singer | 99/2 R |
| 3,467,525 | 9/1969 | Hale et al. | 99/2 R |
| 3,598,605 | 8/1971 | Van Limborgh | 99/2 R |
| 3,661,795 | 5/1972 | Pardun | 426/216 |

*Primary Examiner*—Samih N. Zaharna
*Assistant Examiner*—Ernest G. Therkorn
*Attorney, Agent, or Firm*—Veo Peoples, Jr.; Edward H. Renner

[57] ABSTRACT

A method of preparing an expanded pet food product is disclosed. The product may be prepared from balanced farinaceous-proteinaceous sources containing fat by reacting the nutrient materials under heat, pressure, and mechanical working in the presence of an edible fat transporting agent such as lecithin. The worked material is extruded through an orifice into a medium of lower pressure where part of the water content flashes off as steam forming an expanded product. The fat and fat transporting agents are retained in the product to produce a soft crumb texture.

15 Claims, No Drawings

PET FOOD PRODUCT AND METHOD FOR FORMING SAME

BACKGROUND OF THE INVENTION

Animal foods, in particular pet foods, are marketed in three common forms; dry meal type rations, canned rations and intermediate moisture rations. The dry meal type rations have an expanded, dry cereal type texture and a moisture content of about 10 percent by weight. The canned rations usually have a meat-like character and a typical moisture content of about 70 percent by weight. Intermediate moisture pet foods occupy a position somewhere between that of the dry and canned products; they are formed of balanced proteinaceous-farinaceous materials and typically have a moisture content of about 25 percent by weight and a texture resembling a meat material.

Dry type rations commonly have excellent nutritional properties, superior to the properties of canned and intermediate rations in part due to the dilution effect of the additional moisture in those products. The dry products also have inherently superior storage and stability characteristics to the canned and intermediate moisture products. Canned products spoil rapidly when removed from the can if not refrigerated and intermediate moisture products must have specialized packaging and added chemical preservative systems to retain stability and palatability.

The dry products generally do not have as great a palatability to animals as the canned and intermediate products, however. As a consequence, the dry products are at a competitive disadvantage when the palatability of the product is considered. Dry products have a hard, brittle texture which is less appetizing to animals, particularly if fed in the dry condition. Canned or intermediate products which more closely approximate meat are, of course, readily accepted by animals.

SUMMARY OF THE INVENTION

We have found that we can enhance the palatability of dry extruded pet foods by imparting a soft crumb texture to the products. The texture is analogous to that of a heavy cake such as a pound cake, for example. The inclusion of fat in the pet food matrix forms the soft crumb texture which breaks up into large crumbs when chewed, giving a desirable texture and mouthfeel.

In the past, it has not been possible to incorporate fat directly into the matrix of extruded products because the fat was expressed by the extruder during the extrusion process or the extrudate has no structural integrity. The prior art added fat to the outside of formed, extruded materials to provide the proper nutritional levels. Addition of fat to the outside of the formed food particle doesn't give the soft crumb texture which provides the desired palatability. We are able to incorporate the fat into the nutrient material and extrude the fat containing material by using a fat transporting agent and by combining the fat transporting agent and fat with the product basal prior to extrusion.

It is a primary object of this invention to provide a unique relatively inexpensive method of forming an expanded pet food product from balanced farinaceous-proteinaceous sources and fat to convert them from a generally unpalatable substance to a highly palatable and desirable product that has a desirable soft crumb texture, resilience, good chewing characteristics, and nutritional value. Further, the method allows these properties and characteristics to be varied quite readily.

Another object of this invention is to provide a novel method of producing highly nutritional, palatable food products from balanced farinaceous-proteinaceous sources, such as corn, wheat, meat meal, meat, and soybean meal, with fat such that the method is capable of relatively high production, continuous product output per expense unit of equipment. Moreover, the composition of the product can be greatly varied as desired.

Another object of this invention is to provide a novel highly palatable, highly nutritional pet food product from farinaceous-proteinaceous sources and fat, which is capable of being packaged, shipped and stored for substantial periods, without refrigeration, which has a soft crumb texture in the dry state.

Another object of this invention is to provide from balanced farinaceous-proteinaceous sources and fat, a complete nutritionally balanced ration which is capable of providing complete nutrition for domestic pets.

Another object of this invention is to provide a process for extruding a farinaceous-proteinaceous pet food material containing fat and retain the fat in the extruded structure.

DESCRIPTION OF THE PREFERRED EMBODIMENTS

The concept of this invention pertains broadly to a unique process of producing a soft crumb textured pet food material. Preferably, the ration is produced in a nutritionally complete form from mixed farinaceous-proteinaceous sources and fat with additional vitamin and mineral supplements as needed to make the ration nutritionally complete.

The farinaceous-proteinaceous mixture may include primary farinaceous ingredients which may be any of the more common grains, such as corn, wheat, barley, or oats and their milled parts such as corn meal, flour, wheat germ or grits. Commonly, the farinaceous ingredients will be present in amounts of about 20 to 40 percent of the total mass. The fat may be any of the well known edible fats from animal and vegetable sources. The total fat will normally be present at a level of from 5 to 10 percent by weight depending on the amount of fat present in the farinaceous and proteinaceous sources. Typically, the fat addition will be from 3 – 8 percent.

The farinaceous-proteinaceous mixture will also include proteinaceous ingredients, such as oilseed meal, proteinaceous by-product meals, meats, and microbial protein. The by-product meals include meat meal, poultry meal, and fish meal; the oilseed meals may be soybean meal and cottonseed meal, for example; the microbial protein may be from sources such as torula yeast, petroprotein, and brewer's yeast. These ingredients, preferably present in an amount of 25 to 50 percent of the total mixture, will provide most of the protein content in the final product. In the preferred embodiment, the ratio of proteinaceous ingredient to farinaceous ingredient may be from about 3:1 to 1:1. A ratio of 2:1 would be usual. The farinaceous ingredient and the proteinaceous ingredient together may comprise 55 to 85 percent of the total mixture.

The proteinaceous ingredient will normally be selected to provide the necessary level and balance of protein. Preferably, several proteinaceous ingredients will be present. These ingredients will be selected to balance each other and the farinaceous ingredient whereby the final mixture is balanced with respect to desired amino acids. For example, the protein of corn is low in tryptophane, an essential amino acid, whereas fish meal is high in this component; similarly wheat is low in lysine whereas meat meal will provide this ingredient. Accordingly, mixtures of these complementary ingredients will preferably be used to provide the desired balance.

Other preferred ingredients in the product (typically present in total amount of 1 to 8 percent) may include: flavor ingredients such as fish or meat scrap (when this material is not used as the prime source of protein) hydrolyzed protein or salt; coloring ingredients and dyes; fibrous ingredients such as soybean hulls; and vitamins. Other preservative and plasticizing and humectant materials may be added to the product if desired. Typical plasticizers are glycerol, at a level of from about 0 – 5 percent by weight, propylene glycol at a level of between about 0 – 5 percent by weight, and sorbitol. Potassium sorbate, sorbic acid, citric acid, BHA and BHT preservatives, corn syrup (0 – 12 percent by weight), glucose syrup (0 – 12 percent by weight), corn syrup solids (0 – 12 percent by weight), invert sugar (0 – 5 percent by weight), sucrose, molasses, grain by-product sugars and similar humectant products may also be added.

Typical products may be prepared from the following mixtures:

| Ingredients | Percent |
| --- | --- |
| Yellow corn | 2 – 20 |
| Wheat | 5 – 30 |
| Oats | 0 – 5 |
| Corn gluten feed | 0 – 8 |
| Corn gluten meal | 0 – 10 |
| Liver | 0 – 15 |
| Chicken | 0 – 15 |
| Soybean meal | 10 – 25 |
| Meat and bone meal | 10 – 25 |
| Meat, fish or meat by-products | 0 – 15 |
| Wheat germ meal | 0 – 3 |
| Dried skim milk | 0 – 3 |
| Flavoring, dyes | 0 – 1 |
| Vitamin and mineral supplements | 2.0 |
| Animal fat | 0 – 15 |
| Vegetable oils | 0 – 15 |

To extrude the mixed farinaceous-proteinaceous materials and fat and retain the fat in the extruded structure, the fat and fat transporting agent are added to the dry nutrient materials and thoroughly mixed to disperse the fat and fat transporting agent. After the fat and fat transporting agent are mixed with the dry nutrients, water and any additional plasticizers are blended into the product. The blended mixture may then be extruded without expressing the fat. We have found that if water and additional plasticizers are added with the fat and fat transporting agent or before their addition, the fat is not retained in the extruded structure and is squeezed out of the product during extrusion or the product doesn't have structural integrity which results in a product which does not have the desired soft crumb texture. It is desirable to thoroughly impregnate the dry ingredients with fat and fat transporting agent before addition of the process water and plasticizer.

The process of this invention may be practiced on a conventional extrusion device, such as that disclosed in U.S. Pat. No. 3,496,858. The rotating screw of the extruder device, in combination with the restrainer plate in the extruder, creates a high pressure on the material in the extruder. It is believed that the particulate material fed in changes form until it finally flows in a generally fluid manner even squeezing around the outer periphery of the screw in a recirculating fashion, to cause a severe mechanical working of the substance. The pressures in the extruder are elevated to several hundred psi, and normally fall within the range of about 200 to 700 psig. Part of the pressure is caused by the screw and restrainer plate. Part of the pressure is due to the high temperatures which result both from friction between the flowing product and components of the extruder and from heat that is purposely added to the outside of the extruder, if under normal operation. This added heat is preferablyy obtained by passing steam and/or water through a forward or front annular jacket within the extruder housing around, but separated from, the forward end of the extruder chamber. Steam may also be added directly into the extruder to increase the temperature of the material and/or to raise the moisture content of the material if desired. The amount of heat applied is controlled by typical valving techniques in a manner to obtain temperatures which are not sufficiently high so as to cause the product to scorch or burn, but which are sufficiently high to cause the desired chemical and physical reactions within the material. The amount of added heat to do this will vary with the particular extruder construction, but can be readily determined by trial and error during the initial stages of operation of the equipment.

The temperatures reached by the material in the extruder must be 212° F. and actually should be considerably higher, within a certain specific range in order for a product having a good cellular structure to be formed.

As the plasticizer humectant, fat, and fat transporting agent content increases from about 0 to about 30 percent by weight, the temperature approximately at the die may be decreased from about 300° to about 220° F., but below about 220° F. product quality is poor. The preferred temperature range is about 230° to 280° F., with optimum results having been obtained at about 250° F.

In addition to the steam jacket for adding heat, an annular cooling jacket surrounds the rear portion of the extruder chamber. This has been found desirable in normal operation to maintain lower temperatures in the initial stages of operation.

Operation

In operation the fat and fat transporting agent are added to the farinaceous and proteinaceous materials and thoroughly mixed. Any added edible plasticizing group material such as sugar, glycerol or propylene glycol is added to the mixed materials. Water is then added to produce a moisture level of 20 to 35 percent by weight of the resulting mixture (method of Karl Fischer). Then the blended mixture is fed into the extruder inlet while the extruder screw is rotated at a substantial speed, for example, of about 150 rpm. During this operation, steam is passed through the forward jacket, and normally, cooling water is passed through rear jacket. The meal mixture is advanced in the extruder by the screw while its temperature is increased to within the range of 220° to 300° F. by the steam heat added, by the mechanical working friction, and possibly by the chemical changes occurring. Since the screw tends to advance the material faster than it can be passed through the restricted outlet means, the pressure builds up in the chamber to several hundred pounds per square inch, usually about 200 to 700 psi, while the product is severely mechanically worked in the extruder. By the time the mixture reaches the extruder restrictor plate, it is in the form of a flowable substance which is forced from the main extrusion chamber, after a retention time of usually 30 to 40 seconds, through the outlet orifice into the supplemental chamber. The material remains under elevated pressures and temperatuers as it is advanced by pressure differential through the secondary chamber through the elongated tube, to the die outlet nozzle. As it emerges from the nozzle under the high internal pressures into the much lower atmospheric pressure, the super-heated moisture partially flashes off by evaporation to cause product expansion and partial cooling. After flashing to a moisture content of between about 18 – 30 percent by weight, the product is dried to a moisture content of between about 8 to 17 percent by weight. Normally, the residual water content of the material will be between about 10 to 14 percent by weight, but may be higher if desired. Within this moisture range, the dried product retains a pleasing soft crumb texture due to the effect of the fat and fat transport agent. The addition of the noted humectant materials broadens the range of ambient humidity and time factors which effect the retention of the desired soft crumb texture. Under normal conditions, the soft crumb texture will be retained for six months or more. If the product is being processed properly, it emerges in the form of a continuous elongated expanded member which can be kept in its continuous form or severed into individual as it emerges any ordinary cutting means. The expanded product is porous and has a soft crumb texture. Normally, it is desirable to add coloring materials to the product before extrusion, and to add flavorings before or after extrusion. Additional fat may be added after extrusion if desired, though normally sufficient fat will be incorporated into the product prior to extrusion. The product is nutritiously balanced as it emerges, is sterile, palatable and wholesome.

Palatability and nutrition tests have proven the extruded soft crumb product to be an excellent and desirable food for pets or other animals. The product provides an excellent pet food which is highly palatable to animals. The material can be employed in a variety of forms, can be colored and/or flavored in a variety of fashions, and can be controllably varied in characteristics. By controlling the rate of feed of the product through the extruder, temperatures, degree of expansion, additives, protein content, organic solvent additives and the like, the character of the product can be widely varied while retaining its soft crumb texture.

Although the inventive concepts will be readily understood from the above description by one having ordinary skill in the art, the following examples are given to assure a complete understanding:

EXAMPLE 1

Seventeen pounds of nutritionally balanced farinaceous-proteinaceous material was employed having the following composition:

| | |
|---|---|
| Ground corn | 10 parts by weight |
| Wheat | 10 parts by weight |
| Whole oats | 3 parts by weight |
| Corn gluten feed | 7 parts by weight |
| Corn gluten meal | 8 parts by weight |
| Soybean meal | 12 parts by weight |
| Meat and bone meal | 17 parts by weight |
| Vitamin and mineral supplements | 2 parts by weight |

The material was mixed with 2¼ parts by weight animal fat and 1½ parts lecithin. 1½ parts of glycerol and 6 percent high DE corn syrup was added to the mixed materials containing fat and lecithin. Enough water was added to bring the moisture content of the mixture to 25 percent by weight. A conventional extrusion device was used with steam being supplied to the front jacket to maintain an exit water temperature of 200° to 250° F. and cooling water at room temperature being constantly passed through the rear jacket. The opening in the restraining plate was three-eighths inch in diameter, with the screw being rotated at 150 rpm. The mixture was thus mechanically worked within the extruder at a temperature of around 250° F., with the pressures varying somewhat but being generally above 200 psig. The material was continuously passed through the extruder, passing through the elongated tube and out a rectangular extruder nozzle having a size of ⅜ × ½ inch. The retention time of the material within the extruder was about 30 seconds. The mixture was ejected from the nozzle in a continuous stream and was a coherent structure which expanded with passage through the nozzle to form a porous structure. The fat remained bound in the product and did not press out during extrusion. The product was dried to a moisture content of 12½ percent by weight (method of Karl Fischer) and had an excellent soft crumb texture.

EXAMPLE 2

Seventeen pounds of nutritionally balanced farinaceous-proteinaceous material was employed having the following composition:

| | |
|---|---|
| Ground corn | 10 parts by weight |
| Wheat | 10 parts by weight |
| Whole oats | 3 parts by weight |
| Corn gluten feed | 7 parts by weight |
| Corn gluten meal | 8 parts by weight |
| Soybean meal | 12 parts by weight |
| Meat and bone meal | 17 parts by weight |
| Vitamin and mineral supplements | 2 parts by weight |

The material was mixed with 2¼ parts by weight animal fat. 1½ parts of glycerol and 6 percent high DE corn syrup was added to the mixed dry ingredients and mixed. Enough water was added to bring the moisture content of the mixture to 25 percent by weight. A conventional extrusion device was used with steam and water being supplied to the front jacket to maintain an exit water temperature of 200° to 250° F. and cooling water at room temperature being constantly passed through the rear jacket. The opening in the restraining plate was three-eights inch in diameter, with the screw being rotated at 150 rpm. The mixture was thus mechanically worked within the extruder at a temperature of around 250° F., with the pressures varying somewhat but being generally agove 200 psig. The material was continuously passed through the extruder, passing through the elongated tube and out a rectangular extruder nozzle having a size of ⅜ × ½ inch. The retention time of the material within the extruder was about 30 seconds. The mixture was ejected from the nozzle in a continuous stream. The extruded product was dense and hard and had a brittle hard structure when dried. The product did not exhibit a soft crumb texture.

EXAMPLE 3

The procedure of Example 1 was repeated except that 7 percent by weight of animal fat and 7 percent by weight lecithin were added to the basal and mixed prior to the addition of glycerol and corn syrup. The mixture was extruded and dried as described in Example 1. The product had an excellent soft crumb texture and structural integrity. The product did not express fat during extrusion.

EXAMPLE 4

Example 3 was repeated with simultaneous addition and mixing of fat, lecithin, glycerol, corn syrup, and water. The resulting product fell apart after extrusion into a soft crumbly meal. Product had no structural integrity and did not exhibit a soft crumb texture.

We claim:

1. A method of producing a soft crumb textured expanded food product containing fat from farinaceous-proteinaceous material comprising the steps of mixing farinaceous-proteinaceous material having nutritionally balanced properties, edible fat, and lecithin at a level of between about 1 and 8 percent by weight with the farinaceous-proteinaceous materials and fat; adjusting the moisture content of the mixture to between about 20 and 35 percent by weight by adding water to the mixture; mechanically working the mixed material while simultaneously applying elevated pressures thereto and also heating it to elevated temperatures above 212° F. for a time period sufficient to convert said material into a flowable substance; and then extruding the heated, pressurized, mechanically worked material through restricted orifice means into an environment of a substantially lower pressure, causing expansion of the material and formation of an expanded structure therein having a soft crumb texture.

2. The product of the process of claim 1.

3. A method of producing a soft crumb textured expanded food product from farinaceous-proteinaceous food material and fat comprising the steps of mixing farinaceous-proteinaceous material having nutritionally balanced properties, fat and lecithin; adding water to the mixture to adjust the moisture to between about 20 and 35 percent by weight; mechanically working the mixed materials while simultaneously applying elevated pressures thereto and also heating it to elevated temperatures above 212° F. for a time period sufficient to convert said material into a flowable substance; and then extruding the heated, pressurized, mechanically worked material through restricted orifice means into an environment of a substantially lower pressure causing expansion of the material and formation of an expanded product having a soft crumb texture.

4. A method of treating a nutrient material to form a soft crumb textured palatable and nutritious food product comprising the steps of providing nutrient material including fat; mixing lecithin into the nutrient material at a level of between about 1 and 8% by weight of the mixture; adjusting the moisture content of the mixture to between about 20 and 35 percent by weight; mechanically working the mixed nutrient material while simultaneously heating it to elevated temperatures above 212° F. and also applying elevated pressures for a time period sufficient to convert said material into a flowable substance; then forcing the heated, pressurized, plasticized, mechanically worked material through a restricted orifice means into an environment of a pressure substantially lower than said elevated pressures causing expansion of the product with evaporation of at least part of the equilibrium moisture and the formation of a soft crumb texture.

5. A method of converting a nutrient material into a palatable and nutritious product that has an excellent soft crumb texture comprising providing nutrient material including fat; mixing a lecithin at a level of between about 1 percent by weight but less than about 8 percent by weight of the mixture; adjusting the moisture content of the mixture to between about 20 and 35 percent by weight; mechanically working the mixed material while simultaneously heating it to a temperature of at least above 212° F. for a period of time sufficient to convert said material into a flowable substance while also applying an elevated pressure thereto; and then extruding the mechanically worked, heated and pressurized material through restricted orifice means into an environment of a pressure substantially lower than said elevated pressure to expand the material into an expanded structure having a pleasing soft crumb texture.

6. The method of claim 5 wherein additional plasticizing, humectant, and preservative materials are added to the nutrient materials prior to extrusion.

7. The method of claim 6 wherein the additional plasticizing materials are selected from the group consisting of glycerol, propylene glycol, and mixtures thereof.

8. The method of claim 6 wherein the additional humectant materials are selected from the group consisting of corn syrup, glucose syrup, invert sugar, sucrose, corn syrup solids, molasses, grain by-product sugars, and mixtures thereof.

9. The method in claim 5 wherein said elevated temperature is within the range of about 220° to 300° F.

10. The method in claim 5 wherein said elevated temperature is about 250° F.

11. The method in claim 5 wherein said elevated pressure is within the general range of 200 to 700 psi.

12. The method in claim 5 wherein said material is a nutritionally balanced mixture.

13. The method of claim 5 wherein the extruded structure is dried to a moisture content of between about 8 and 17 percent by weight.

14. The method of claim 5 wherein the fat is added at a level of between about 3 and 8 percent by weight of the farinaceous-proteinaceous material.

15. The method of claim 5 wherein the ratio of lecithin to fat is between about 1:2 and 2:1.

* * * * *

UNITED STATES PATENT AND TRADEMARK OFFICE
CERTIFICATE OF CORRECTION

PATENT NO. : 3,908,025
DATED : September 23, 1975
INVENTOR(S) : T. Miller & C. Hansen It is certified that error appears in the above—identified patent and that said Letters Patent are hereby corrected as shown below:

Column 1, line 51 - "piror" should read "prior"

Column 5, line 35 - insert "chunks" prior to the word "as"

Column 5, line 35 - insert "by" immediately after the word "emerges"

*Signed and Sealed this*

*twenty-ninth* Day of *June 1976*

[SEAL]

Attest:

RUTH C. MASON
*Attesting Officer*

C. MARSHALL DANN
*Commissioner of Patents and Trademarks*